Figure 1:
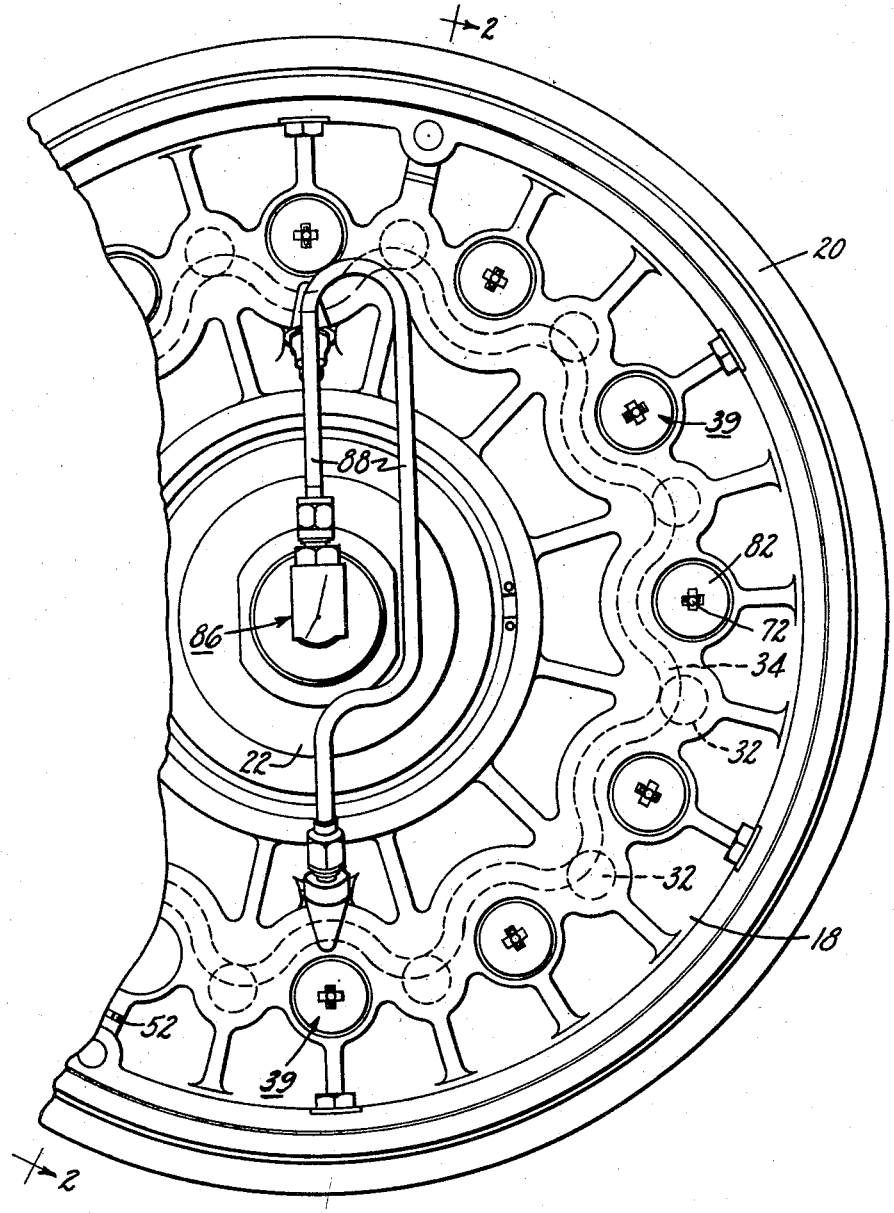

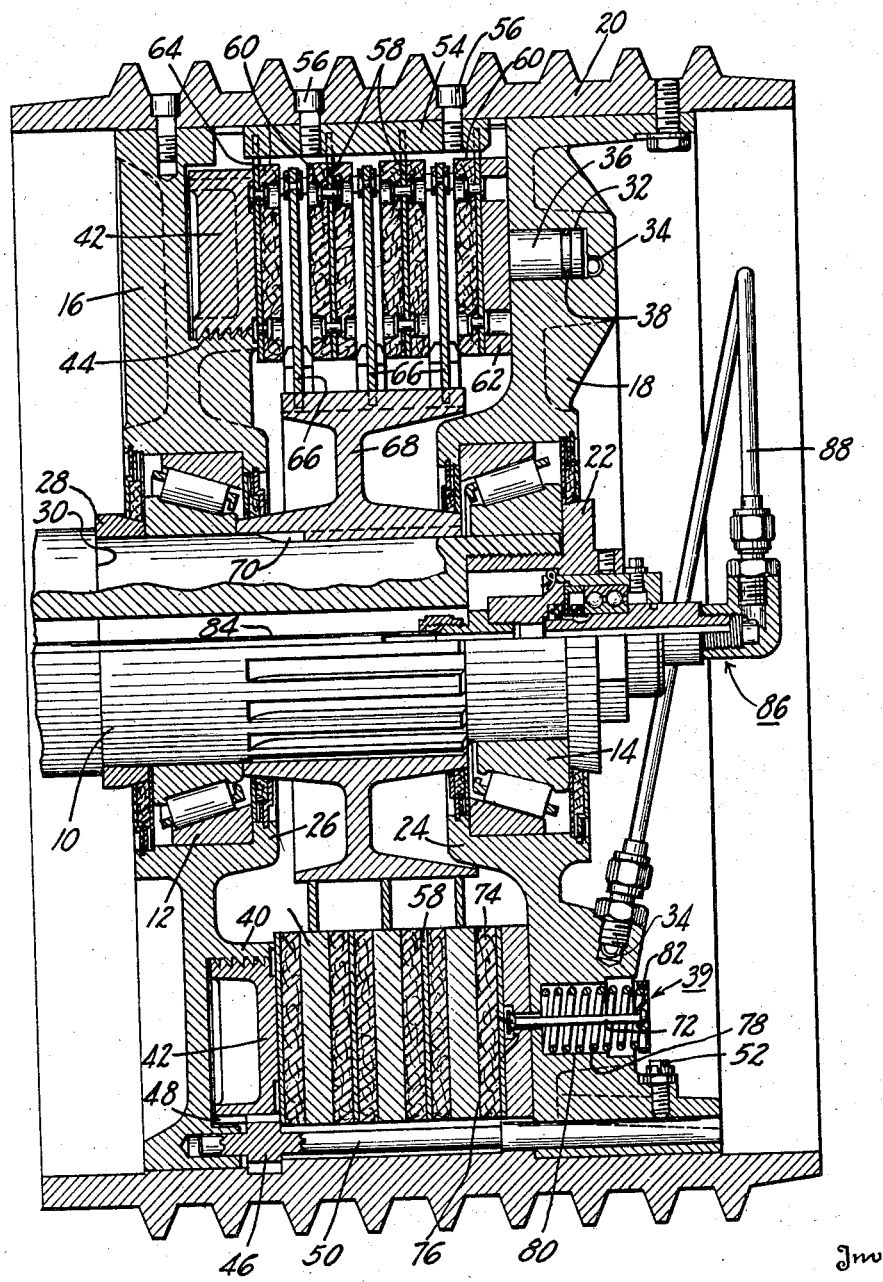
FIG.2  FRANKLIN C. ALBRIGHT

United States Patent Office 2,885,033
Patented May 5, 1959

2,885,033

AIRCRAFT WHEEL AND BRAKE ASSEMBLY

Franklin C. Albright, South Bend, Ind., assignor to Bendix Aviation Corporation, South Bend, Ind., a corporation of Delaware Continuation of abandoned application Serial No. 144,943, February 18, 1950. This application April 11, 1956, Serial No. 577,612

4 Claims. (Cl. 188—152)

The present invention relates to an aircraft wheel and brake assembly having greater load carrying and braking capacities than the conventional assembly of the same outside physical dimensions. This application is a continuation of my application Serial No. 144,943, filed February 18, 1950 and now abandoned.

The object of the present invention is to provide a wheel and brake assembly having narrower dimensions than a conventional assembly but capable of delivering the same performance. In achieving this object, the assembly will have fewer parts, be more economical to produce, and be lighter in weight than the conventional assembly.

The above object is attained by utilizing the wheel sides as parts of the brake, one side serving to house the hydraulic actuating mechanism, and referred to hereinafter as a "carrier," and the other side serving as a "reaction" brake element against which the other brake elements are compressed.

Other objects will become apparent as the description proceeds.

In the drawings:

Figure 1 is a partial side elevation of an embodiment of the present invention; and Figure 2 is a sectional view taken substantially on section line 2—2 of Figure 1.

Generally stated, the present invention is comprised of a wheel having axially spaced sides and a disc type brake contained for the most part between said sides, one of said sides embodying the hydraulic actuator portion of the brake. With this arrangement, the other one of the sides becomes the "reaction" member of the brake while at the same time serving as a wheel support.

Referring now to the drawings, a stationary hollow axle 10, usually rigidly fastened to the lower extremity of an aircraft landing gear strut, receives a pair of spaced, inwardly inclined roller bearings 12 and 14 which rotatably support, respectively, wheel sides 16 and 18. Secured to the outer peripheries of these sides 16 and 18 is a rim portion 20 of any preferred design and shown in the drawings as being adapted for track gear use. A hub nut 22 is threadedly received in the end of axle 10 to abut against the outer edge of bearing 14 and to thereby hold the wheel against right-hand movement. A radial flange 24 is formed on the inner peripheral portion of side 18 to engage the other side of bearing 14, thereby positively locating said bearing 14 and the side 18 in position with respect to axle 10. The other side 16 is similarly provided with a radial flange 26 which bears against one side of bearing 12 while the other side of this bearing engages a spacer ring 28 prevented from leftward movement by a complementary shoulder 30 on axle 10. The bearings and wheel sides are thus positively held in axial position in proper spaced relation.

The "carrier" or side 18 is shown as being formed with a plurality of circumferentially-spaced cylinder bores 32 interconnected by means of a conduit or passage 34, these bores reciprocably receiving pistons 36 having rubber or the like sealing rings 38 fitted thereto. Return spring assemblies generally indicated by reference numeral 39 are also carried in side 18 between bores 32 thus making the radial portions of this side between adjacent bores 32 and spring assemblies 39 spoke sections which obviously serve to carry a proportionate share of the load imparted to axle 10. Other types of actuators could be used in place of the spot type above described, one example being an annular actuator. However, in using this latter type of actuator it may be necessary to increase the axial thickness of the side 18 to prevent the load of the vehicle from squeezing the open end of the annular chamber together thereby binding the piston against actuating movement. Various expedients are available to provide this additional support, and since this invention comprehends a much broader concept of novelty, these expedients will not be adverted to hereinafter.

The other side 16 has an axially inwardly protruding concentric threaded portion 40 upon which is received a ring nut 42 which serves to directly take the thrust load of the brake for transmission to side 16 through the connecting threads 44. This nut 42 affords a convenient means of adjusting the running clearance of the brake elements and may be rotated by means of the pinion 46 journaled near the outer peripheries of sides 16 and 18 to engage the gear teeth 48 in the nut 42. By rotating the shaft 50, pinion 46 is rotated causing corresponding movement of nut 42 which is thereby shifted axially on the threads 44. A set screw 52 may be used to retain shaft 50 against accidental rotation and to secure annulus 42 in axial position.

Moving now to the friction assembly of the brake, a plurality of circumferentially-spaced axially extending rotor keys 54 are secured by any suitable means to the inner peripheral surface of the rim 20; however, these keys may of course be fastened between the outer peripheral portions of sides 16 and 18 depending upon preferred design practice. In the illustrated embodiment, screws 56 are utilized to fasten rotor keys 54 in place. A pair of annular brake elements or rotors 58 faced with suitable friction lining 60 have their outer peripheries notched to slidably engage keys 54 whereby said rotors will be caused to rotate with the wheel while being shiftable axially. A pressure plate 62 faced on one side with friction lining 60 is likewise formed for cooperative engagement with keys 54 and is disposed adjacent side 18 contiguous with the exposed ends of pistons 36. Thus by moving these pistons 36 toward the left, the pressure plate 62 will be correspondingly moved. Completing the rotary brake elements, an annular plate 64, similar in shape to pressure plate 62, has a lined surface which faces inwardly with the other surface facing outwardly to abut against nut 42. It is conceivable that this element 64 could be dispensed with and the friction lining fastened directly to the annulus 42. While friction lining has been described and illustrated, it is to be understood that any type of rubbing surfaces may be used in lieu thereof without departing from the spirit of this invention.

In order to support the annular non-rotatable brake elements or stators 66, a torque-absorbing annulus, or torque ring 68 is secured against rotation on axle 10 by any suitable means and, as illustrated, by the mating splines 70. The outer periphery of this torque ring 68 is formed with axially extending keys, similar to the keys 54, which are cooperatively engaged by mating portions of the inner peripheries of stators 66. Thus these stators may be shifted axially while being held against rotation. The stators 66, illustrated as being of the segmented type, are interleaved with the rotor members whereby leftward movement of the pressure plate 62 will compress the rotors and stators together against the reaction element 64. At this point it becomes evident that the side 16 serves the dual function of the braking reaction member, or backing plate and a load supporting section of the wheel.

Referring now to the return spring assemblies 39, it is seen that only the pressure plate 62 is urged to released position. Each assembly 39 comprises a pin 72 passing through aligned openings in the side 18 and pressure plate 62. The pin 72 has a head 74 accommodated in a recess 76 surrounding the pressure plate opening whereby said pressure plate 62 may be drawn toward the right by corresponding movement of the pin 72. A helical spring 78 is compressed in a socket 80 in side 18, around pin 72, to bear against retainer 82 secured to the right-hand end of pin 72. The compressed load of spring 78 is thus acting to constantly urge pressure plate 62 to the right and released position.

The fluid pressure system of the brake comprises a stationary conduit 84 centrally disposed in axle 10 which is terminated at its right hand end in a swivel fitting generally indicated by reference numeral 86. This fitting 86 is utilized to transfer fluid pressure from stationary conduit 84 to a main rotary conduit 88 which communicates with conduit 34 in side 18. The fitting 86 is of conventional design; therefore, it is not deemed necessary to give a detailed description thereof at this point.

A brief explanation of the operation of the described embodiment follows. With the wheel rotating and the brakes released, pressure fluid is introduced into stationary conduit 84, which passes through swivel fitting 86, external conduit 88, conduit 34, and into the cylinders 32 to force pistons 36 outwardly against pressure plate 62. The rotors and stators are thereby compressed against the lining of element 64 to generate the desired braking torque.

In releasing the brakes, the pressure in conduit 84 is relieved sufficiently to allow return spring assemblies 39 to shift pressure plate 62 to the right and released position.

In order to exemplify how the present invention accomplishes the earlier mentioned objects, reference is hereby made to Du Bois applications Serial Nos. 71,891 (now Patent No. 2,551,253, dated May 1, 1951) and 647,781 (now Patent No. 2,551,252, dated May 1, 1951), filed January 21, 1949, and February 15, 1946, respectively, to obtain a comparison between the conventional type of wheel and brake disclosed therein and the embodiment of this invention. By conventional construction is meant the stationary brake member which carries the hydraulic actuators and the juxtaposed disc which serves as the backing plate or reaction member for the brake. With this arrangement it is obvious that the spaces between the wheel sides and the brake members are wasted and only serve to increase the width dimension of the assembly. Further, since the side adjacent the backing plate is usually convexed to accommodate the backing plate, it is obvious that its thickness will necessarily be greater, as compared with a co-planar side, to withstand specified wheel-load-carrying-stresses.

The present invention overcomes these deficiencies of prior art constructions, with the above mentioned wasted spaces now being occupied, and the sides of the wheel kept in single planes. Further advantages to be gained by this invention, are the use of fewer parts, reduction in size of the parts and the reduction in cost of production.

Other advantages will appear obvious as further study is made of this invention, which if mentioned here would only serve to lengthen the description.

Although only one embodiment of the invention has been illustrated and described, various changes in the form and relative arrangements of the parts may be made to suit requirements.

I claim:

1. An aircraft wheel and brake assembly comprising a wheel having a rim and spaced rim-supporting sides rotatably supported on an axle member, one of said sides serving as a "carrier" for a brake actuating means, and the other of said sides serving as a "reaction" member for the axial pressure of the brake, said reaction member being axially and radially supported on said axle member, the "carrier" side of the wheel having a plurality of circumferentially-spaced cylinder bores, pistons received in said bores, a main conduit member rotatable with said wheel communicating with the interiors of said cylinders, a swivel connection adapted to transfer fluid pressure from a stationary conduit located in the axle member to said main conduit member, a non-rotatable annular torque-absorbing member adapted to be removably secured to the axle member between the sides of the wheel, one or more annular brake discs carried on the outer periphery of said torque-absorbing member and having axial but not rotative movement, one or more lined annular brake discs carried by said wheel and having axial movement with respect to the wheel, a lined annular pressure plate carried by said wheel and in operative engagement with said pistons, a lining carried on the "reaction" side of the wheel, said pistons being actuable to frictionally compress said brake discs between said pressure plate and said last mentioned lining, and return springs carried by said one side plate between said bores urging said pressure plate to released position.

2. An aircraft wheel and brake assembly comprising a wheel having a rim and spaced rim-supporting sides rotatably supported on an axle member, one of said sides serving as a "carrier" for hydraulic brake actuating means, and the other of said sides being in abutment with a tapered bearing means to serve as a "reaction" member for the axial pressure of the brake, the "carrier" having a plurality of circumferentially-spaced cylinder bores, pistons received in said bores, a rotatable conduit communicating with the interiors of said bores, a non-rotatable annular torque-absorbing member adapted to be removably secured to the axle member between said sides, a stationary conduit located in said axle member and having a swivelled connection with said rotatable conduit, a plurality of spaced annular brake discs carried on the outer periphery of said torque-absorbing member having axial but not rotative movement, a plurality of lined annular brake discs carried by said wheel having axial movement and being interleaved with said non-rotatable brake discs, a lined annular pressure plate carried by said wheel in cooperative relation with said pistons, and a lining supported on the "reaction" side of the wheel, said pistons being actuable to frictionally compress said brake discs between said pressure plate and said last mentioned lining.

3. An aircraft wheel and brake assembly comprising a stationary wheel carrier, a wheel having a rim and first and second axially spaced substantially flat rim-supporting sides, anti-friction bearings rotatably supporting at least one of said sides on said wheel carrier, said bearings being inwardly inclined toward said wheel carrier whereby outward axial force on said sides can be taken by the wheel carrier, the rotatable side of said wheel having a plurality of circumferentially-spaced cylinder bores, pistons received in said bores, a main conduit member rotatable with said wheel communicating with the interiors of said cylinders, a stationary conduit located in said wheel carrier, a swivel connection adapted to transfer fluid pressure from said stationary conduit to said main conduit member, a non-rotatable annular torque-absorbing member arranged on the wheel carrier between the sides of the wheel, a plurality of circumferentially spaced axially extending splines formed on the outer periphery of said torque-absorbing member, one or more annular brake members engaging said splines for axial but not rotative movement, a plurality of circumferentially spaced axially extending keys secured to said wheel between said sides and radially outwardly from said splines, at least one annular brake member carried by said keys for axial movement and for rotation with said wheel, and a pressure plate rotatable with said wheel and slidably engaging said keys, said plate being in operative engagement with said pistons, said pistons being actuable to frictionally compress said brake discs between said pressure plate and said second rim-supporting side.

4. An aircraft wheel and brake assembly comprising a stationary wheel-supporting means, a wheel having a rim and at least one substantially flat rim-supporting side, spaced anti-friction bearings rotatably supporting the wheel, said bearings being inwardly inclined toward the center of the wheel whereby axial forces on said wheel may be transmitted to said wheel-supporting means, said substantially flat rim-supporting side having a plurality of circumferentially-spaced cylinder bores, pistons received in said bores, a main conduit member rotatable with said wheel communicating with the interiors of said cylinders, a stationary conduit located in said stationary wheel supporting means, a swivel connection adapted to transfer fluid from said stationary conduit to said rotatable conduit member, a non-rotatable annular torque-absorbing member operatively secured to said stationary wheel-supporting means, a plurality of circumferentially spaced axially extending splines formed on the outer periphery of said torque-absorbing member, one or more annular brake members engaging said splines for axial but not rotative movement, a plurality of circumferentially spaced axially extending keys secured to said wheel between the sides thereof and radially outwardly from said splines, at least one annular brake member carried by said keys for axial movement and for rotation with said wheel, and a pressure plate rotatable with said wheel and slidably engaging said keys, said plate being in operative engagement with said pistons, said pistons being actuatable to frictionally compress said brake discs by pressure exerted against said pressure plate.

References Cited in the file of this patent

UNITED STATES PATENTS

| 1,968,130 | Criley | July 31, 1934 |
| 2,055,081 | Jacobs | Sept. 22, 1936 |
| 2,089,733 | Criley | Aug. 10, 1937 |
| 2,143,861 | Clouse | Jan. 17, 1939 |
| 2,386,220 | Lawler et al. | Oct. 9, 1945 |
| 2,706,018 | Du Bois | Apr. 12, 1955 |

FOREIGN PATENTS

| 551,993 | Germany | June 8, 1932 |